A. SCHULZE.
LOADING AND UNLOADING DEVICE.
APPLICATION FILED MAR. 11, 1912.

1,052,096.

Patented Feb. 4, 1913.

Witnesses
T. P. Britt
E. C. Dufor

Inventor
Andrew Schulze

By
Attorney

UNITED STATES PATENT OFFICE.

ANDREW SCHULZE, OF WASHINGTON, DISTRICT OF COLUMBIA.

LOADING AND UNLOADING DEVICE.

1,052,096.  Specification of Letters Patent.  Patented Feb. 4, 1913.

Application filed March 11, 1912. Serial No. 682,849.

*To all whom it may concern:*

Be it known that I, ANDREW SCHULZE, a citizen of the United States, residing at Washington, in the District of Columbia, have invented certain new and useful Improvements in Loading and Unloading Devices; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in the loading and unloading of freight and the like on automobiles, trucks and the like, and the object of the invention is to provide an apparatus by means of which the automobiles, trucks and the like can be loaded and unloaded more quickly and cheaply than the loading and unloading can be done by hand.

A further object of the invention is to provide a construction which provides for the loading and unloading of separate cages or crates, which cages or crates are loaded and unloaded to and from an automobile, truck and the like, in such manner that the time required for the loading and unloading of an automobile, truck and the like, is reduced to a minimum, and a great saving is thereby occasioned.

It is essential in the loading and unloading of automobiles, trucks and the like, to place the goods or merchandise on the truck and to properly load the same by hand. This operation occasions considerable loss of time as the use of the automobile or truck is lost during the time which it is required to load and unload the same. For short hauls the time required for loading and unloading exceeds the time required for transporting the load, and consequently in many instances the greater portion of the time is wasted while the truck is being loaded and unloaded.

It is for the purpose of arranging a simple and efficient loading and unloading device in order to save time and labor that I have constructed this present invention; and the invention consists in the novel construction and arrangement which provides for the loading and unloading of the automobile, truck and the like, by means of the motive power of the automobile, truck and the like, said loading and unloading means being driven through the medium of suitable mechanism in such manner that the crates, boxes, cages or the like, can be quickly loaded and unloaded to and from the automobile, truck and the like.

The invention further consists in certain details of construction and in combinations of parts, all of which will be first fully described and afterward specifically pointed out in the appended claims.

Referring to the accompanying drawings which illustrate several modifications of the invention.

Like numerals of reference indicate the same parts throughout the several figures in which.

1 indicates an automobile truck of any size, design or construction having wheels and running gear and an engine or motor 2.

Figures 1, 2:
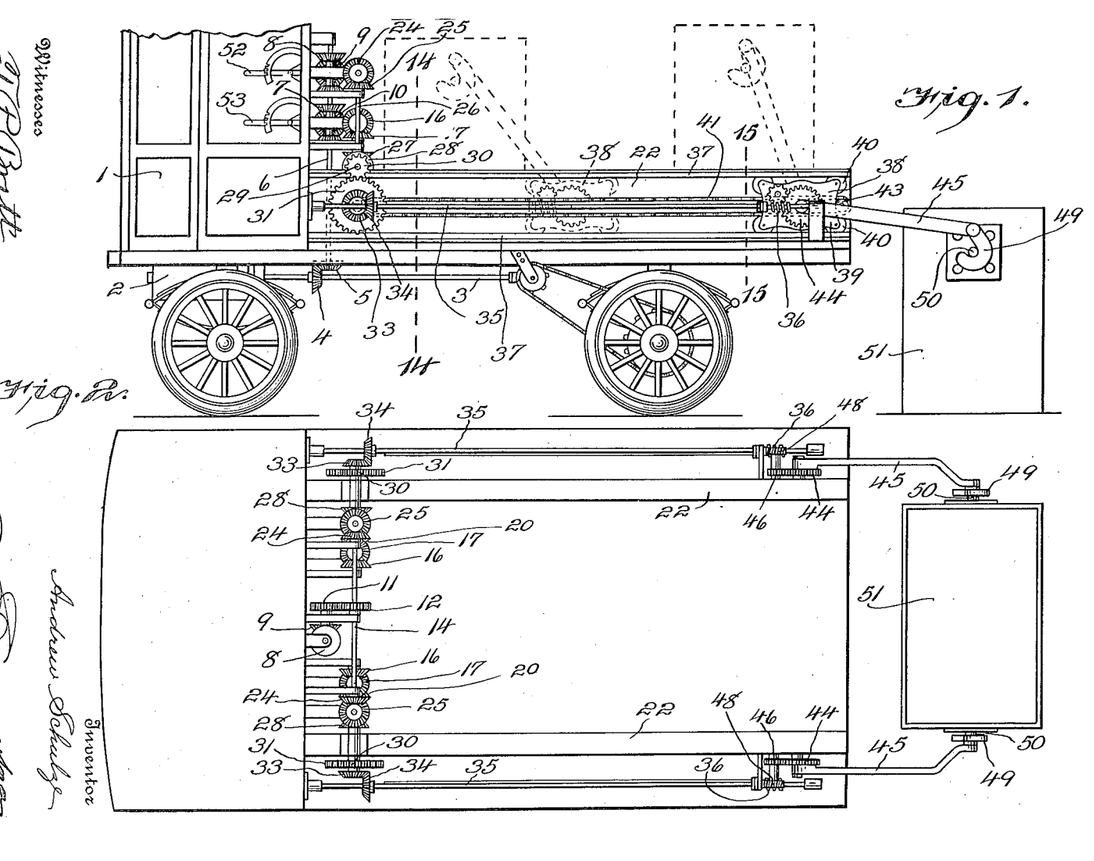
Figure 1 is an elevation of an automobile truck illustrating the loading and unloading mechanism in elevation.
Fig. 2 is a top plan view of the same.
Figure 3:
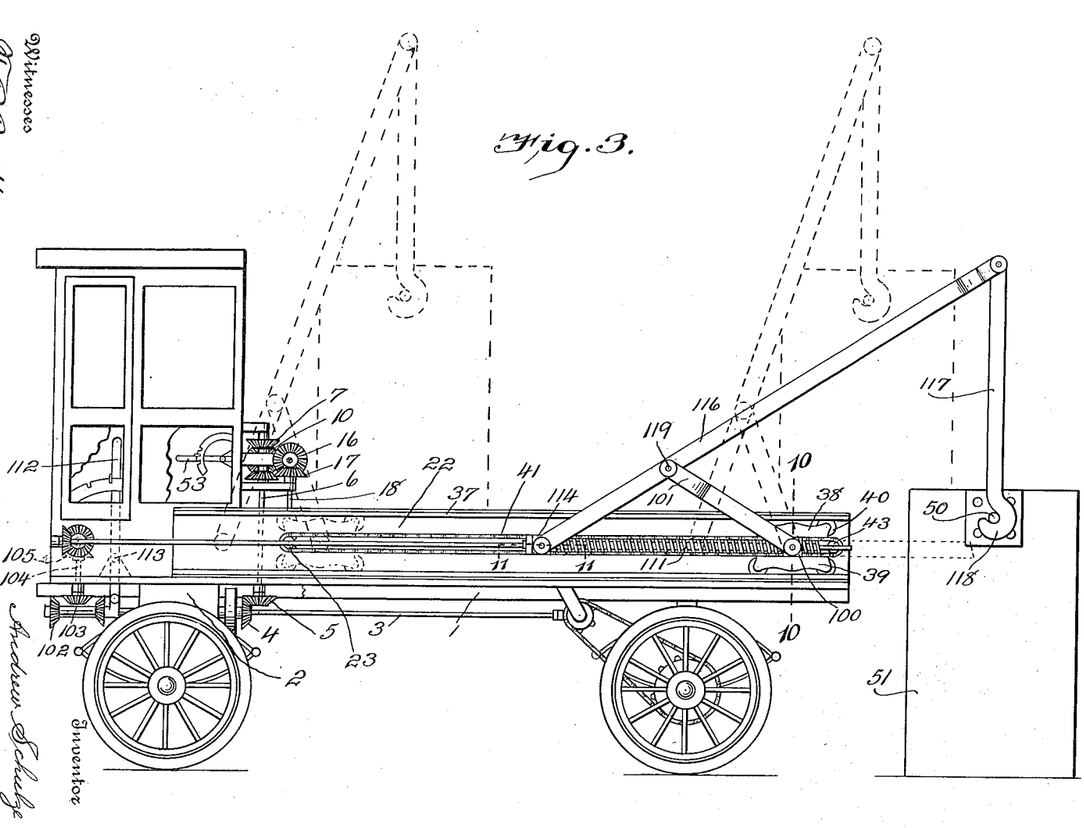
Fig. 3 is a similar view illustrating a modification of the construction shown in Fig. 1.
Figures 14, 15, 16:
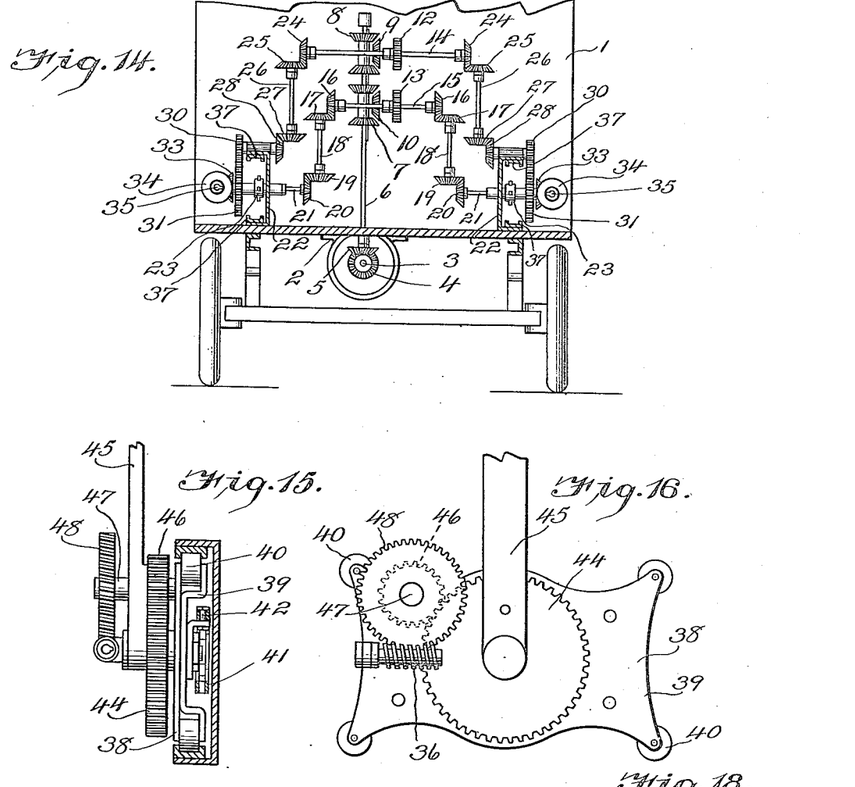
Fig. 14 is a vertical transverse sectional view taken on line 14—14 of Fig. 1.
Fig. 15 is an enlarged vertical sectional view taken on line 15—15 of Fig. 1.
Fig. 16 is an enlarged side elevation of the traveler illustrated in full lines in Fig. 1.
Figure 17:
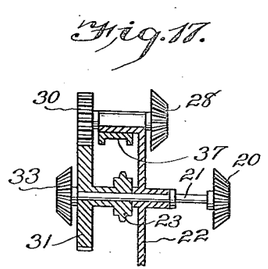
Fig. 17 is an enlarged transverse sectional view of the traveler driving gears illustrated in Fig. 1.
Figure 18:
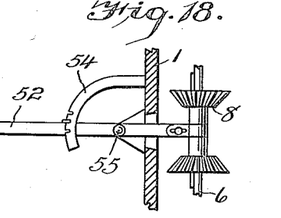
Fig. 18 is a fragmentary vertical longitudinal sectional view of one of the gear shifting constructions illustrated in Fig. 1.

Referring particularly to Fig. 1 it will be seen that the driving shaft 3 from the motor 2 is provided with a bevel gear 4 which bevel gear meshes with a bevel gear 5 mounted on a vertical shaft 6, and on said vertical shaft 6 are two pair of slidable bevel gears 7 and 8, said pair of bevel gears 7 and 8 being slidable on the shaft 6 and rotatable therewith in such manner that the rotation of the vertical shaft 6 will be communicated to both pair of bevel gears 7 and 8. Disposed vertically and between each pair of bevel gears 7 and 8 is an upper bevel gear 9 and a lower bevel gear 10, which bevel gears are suitably mounted on horizontal shafts as shown in Fig. 2, and on each shaft is a spur gear 11. Meshing with the spur gears 11 is an upper spur gear 12 and a lower spur gear 13 mounted on the transverse horizontal shafts 14 and 15, the lower transverse horizontal shaft 15 having at each end thereof a bevel gear 16 which meshes with a bevel gear 17 mounted on the vertical shafts 18, a bevel gear 19 being mounted on the lower end of each vertical shaft 18 which meshes with bevel gears 20 mounted on transverse horizontal shafts 21, said transverse horizontal shafts 21 passing through the traveler casing 22 at each side of the truck body, and within each traveler casing 22 is arranged a sprocket wheel 23. Referring now to the upper transverse horizontal shaft 14 it will be seen that the same carries at each end thereof a bevel gear 24 which meshes with bevel gears 25 mounted on vertical shafts 26, said vertical shafts having at their lower ends bevel gears 27 meshing with bevel gears 28 on transverse horizontal shafts 29, said transverse horizontal shafts 29 having at their outer ends pinion wheels 30 which mesh with spur gears 31 which are mounted on transverse horizontal shafts 21, said transverse horizontal shafts 21 having bevel gears 33 thereon meshing with bevel gears 34 on the longitudinal horizontal worm shafts 35, said worm shafts 35 having slidably mounted thereon a worm 36 (Fig. 1) which worm is freely slidable on the shaft 35 but not rotatable thereon, the same being keyed or otherwise secured in such manner that rotation of the shaft 35 is communicated to the worm 36. Arranged in the traveler casings 22 is an upper and a lower channel guide 37, the traveler 38 comprising a body 39 on which four rollers 40 are mounted at each corner of the body, said rollers 40 rolling in the channel guides or tracks 37 as is clearly shown in Fig. 15, while an endless chain 41 is secured to the traveler 38 at 42 (Fig. 15) so as to move the traveler longitudinally on its tracks in the manner as indicated in dotted lines in Fig. 1, said endless chains 41 passing over the sprocket wheels 23 previously described at the forward portion of the vehicle and over sprockets 43 at the rear end of the vehicle. Mounted on the travelers 38 is a spur gear 44 carrying an arm 45, said spur gear 44 being meshed with a pinion wheel 46 mounted on the shaft carried on the traveler 38, and mounted on the outer end of the shaft 47 is a worm gear 48 which meshes with the worm 36 previously described, said worm 36 being slidably mounted on the longitudinal shaft 35, it being of course understood that the construction and parts just described are duplicated on both sides of the vehicle. Pivoted on the ends of the arms 45 are hooks 49 which are designed to engage projecting pins or studs 50 on cages or crates 51, which cages or crates 51 are designed to be filled with goods, merchandise or the like, before loading onto the truck, the manner of handling the cages or crates being clearly shown in Fig. 1. Arranged conveniently to the driver are two levers 52 and 53, more particularly shown in Fig. 18, said levers acting in a toothed rack 54 and pivoted at 55, each of said levers being connected to a pair of the slidable bevel gears 7 and 8 in such manner that either or both pair of said slidable gears 7 and 8 can be practically raised or lowered at the will of the operator.

Having thus described the construction illustrated in this modification its operation is as follows: When it is desired to load one or more cages or crates 51 onto the truck 1 the upper lever 52 is operated so as to bring one bevel gear of the upper pair of bevel gears 8 into engagement with the bevel gear 9, which bevel gear 9, by means of the mechanism previously described, drives the sprocket wheels 23 and the endless chains 41 to move the traveler 38 into the position shown in full lines in Fig. 1. When in this position the lower lever 53 is operated so as to bring one of the lower pair of bevel gears 7 into mesh with the bevel gear 10 which through the medium of the gearing previously described rotates the worm shaft 35, which worm shaft 35 drives the spur gear 44 through the intermediate gearing to raise the arms 45 into position shown in dotted lines in Fig. 1. This movement of the arms 45 raises the cage or crate 51 into position shown in dotted lines in Fig. 1. When the same is in this position the lever 53 is moved into an intermediate position which throws both lower pairs of gears 7 out of mesh with the gear 10, the crate or cage 51 being in position shown in dotted lines in Fig. 1. The movement of the upper lever 52 in the opposite direction causes the intermediate gearing previously described to rotate the sprocket wheels 23 and draws the traveler 38 and its suspended crate or cage forwardly of the machine as illustrated in dotted lines in Fig. 1, and by means of these constructions the crate or cage can be deposited in any convenient desired position in the truck. As soon as the crate or cage has been loaded the traveler 38 is again run back to continue the loading operation until the truck is loaded as desired. When the loading operation has been accomplished the operating levers 52 and 53 are stood in their intermediate positions which movement disconnects all gearing and the motor is then employed to propel the truck.

It will be clearly seen from this construction and from the arrangement of parts as herein described that the loading and unloading of a truck can be accomplished quickly and with despatch. The operation of removing or unloading the crates or cages from the truck is effected in the reverse manner as the operation just described so that the crates or cages can be unloaded and delivered one at a time or the entire load can be deposited whenever desired.

Figures 8, 9, 10, 11:
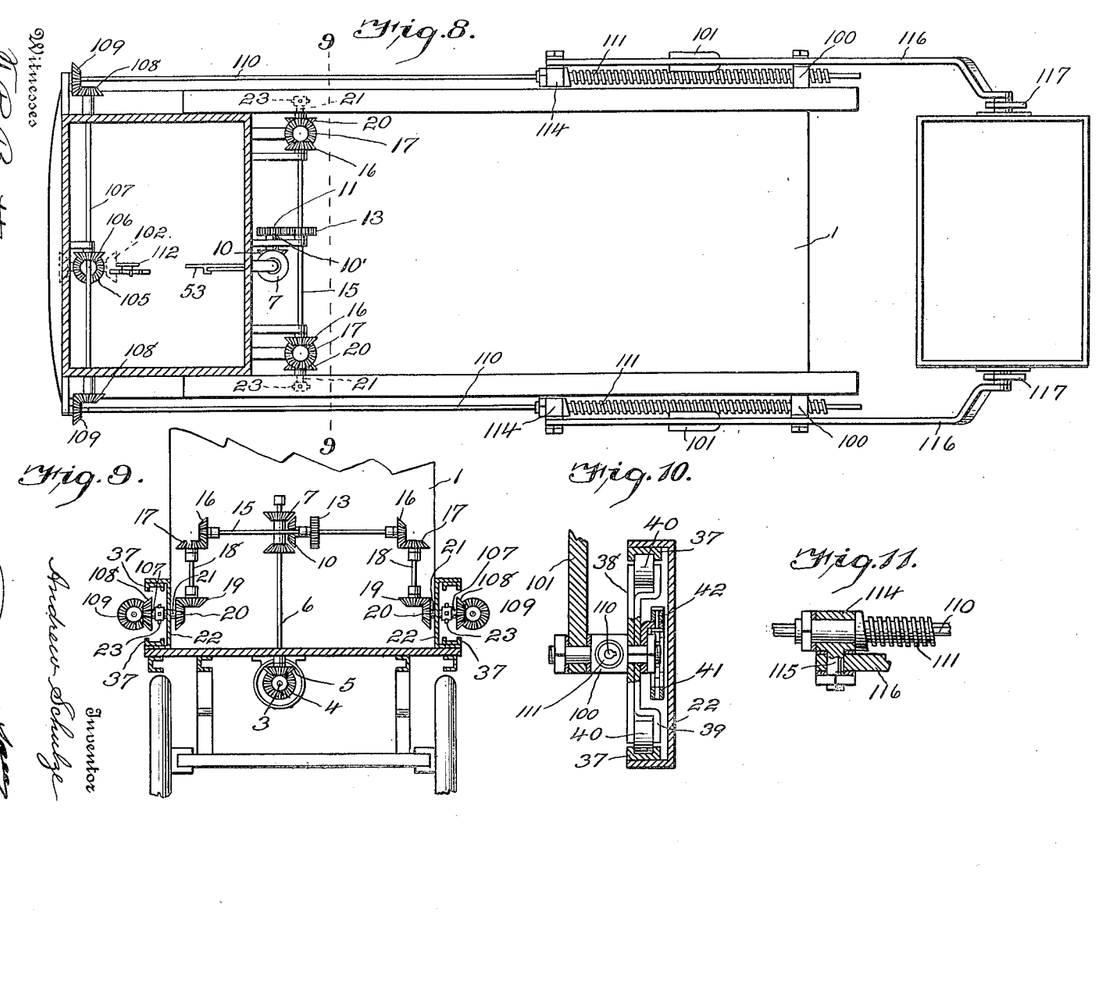
Fig. 8 is a top plan view of the construction illustrated in Fig. 3.
Fig. 9 is a vertical sectional view taken on line 9—9 of Fig. 8.
Fig. 10 is an enlarged vertical sectional view taken through line 10—10 of Fig. 3.
Fig. 11 is an enlarged sectional view partly in elevation taken through line 10—10 of Fig. 3.
Figure 12:
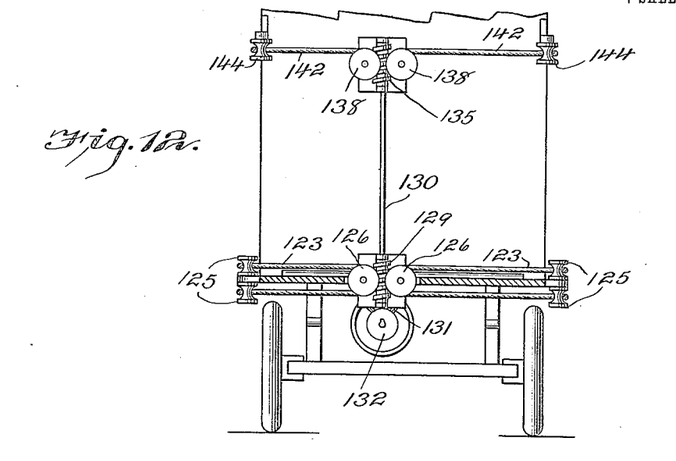
Fig. 12 is a vertical transverse sectional view taken on line 12—12 of Fig. 6.
Figure 13:
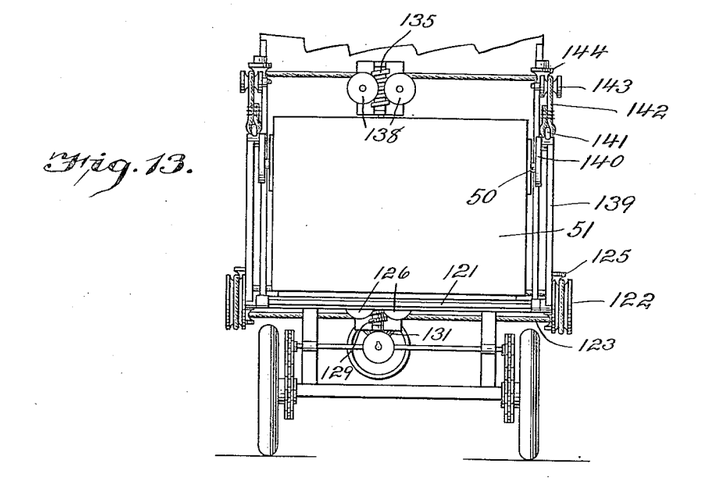
Fig. 13 is a rear end elevation of the construction shown in Fig. 6.

Referring to the modification illustrated in Figs. 3, 8, 9, 10 and 11 it will be seen that the engine shaft 3 is provided with a bevel gear wheel 4 which meshes with the bevel gear 5 mounted on the vertical shaft 6, said vertical shaft 6 carrying a pair of slidable bevel gears 7 both of which are adapted to mesh with a bevel gear 10 mounted on a transverse horizontal shaft 10', said horizontal shaft 10' carrying a spur wheel 11 which meshes with a spur wheel 13 on a transverse horizontal shaft 15, said transverse horizontal shaft 15 carrying at each end thereof a bevel gear 16 which meshes with bevel gears 17 on vertical shafts 18 carrying bevel gears 19 at their lower ends, said bevel gears 19 meshing with bevel gears 20 mounted on transverse horizontal shafts 21, said horizontal shafts 21 carrying sprocket wheels 23, the shafts 21 passing through the wall 22 of the traveler casing, said sprocket wheels 23 carrying endless chains 41, the arrangement of the chains 41, the traveler 38 and the traveler tracks or guides 37 being the same as previously described except that the traveler 38 is provided with a worm screw nut 100 and a pivoted arm 101 as is clearly shown in Fig. 10.

Referring again to Fig. 3 it will be seen that the engine shaft extends forwardly of the engine and carries a pair of slidable bevel gears 102 either of which mesh with a bevel gear 103 mounted on a vertical shaft 104 on which is mounted a bevel gear 105 which meshes with a bevel gear 106 mounted on a transverse horizontal shaft 107 on the outer ends of which are mounted bevel gears 108 which mesh with bevel gears 109 mounted on the ends of the horizontal longitudinal shafts 110 which shafts 110 carry a longitudinal slidable thread 111, which threads into the nut 100 on the traveler 38 as is clearly shown in Fig. 8, the said endless chain 41 being connected to the traveler 38 at 42 in such manner that the said traveler can be carried into position shown in dotted lines in Fig. 3. 112 indicates a lever conveniently arranged near the operator which lever is pivoted at 113 for the purpose of sliding the slidable gears 102 into and out of mesh with the bevel gear 103 which rotates the longitudinal shafts 110. Slidable with the longitudinal slidable thread 111 is a member 114 carrying a projecting pin or stud 115 on which is mounted a longitudinal lever arm 116, said longitudinal lever arm 116 having pivoted at its outer end a link 117 having a hooked lower end 118 as is clearly shown in Fig. 3.

Having thus described the details of the constructions shown in Figs. 3, 8, 9, 10 and 11 its operation is as follows: When it is desired to load a crate or cage 51 the hooks 118 are connected to the studs 50 and the lever 112 is moved to throw one of the slidable gears 102 into mesh with the bevel gear 103 and through the intermediate mechanism previously described the longitudinal shafts 110 on each side of the body are rotated which threads up the longitudinal slidable thread 111 into the nut 100 on the traveler 38, and as said thread 111 progresses rearwardly it carries with it the lower end of the longitudinal lever arm 116, and as said longitudinal lever arm 116 is pivoted at 119 to the lever arm 101 said arms are caused to be brought together into the position shown in dotted lines in Fig. 3, which movement of the lever arms 101 and 116 causes the crate or cage to be raised into position shown in dotted lines in Fig. 3. When the crate or cage is in this position the operating lever 53 is moved to bring one of the slidable bevel gears 7 into mesh with the bevel gear 10 which, through the mechanism previously described, moves the endless chain 41 and causes the traveler 38, slidable thread 111 and the longitudinal lever arm 116 to be moved bodily forwardly of the truck and in the position shown in dotted lines in Fig. 3 so that the crate or cage can be deposited on the truck at any convenient or desired position thereon. The manner of unloading the crates or cages is accomplished by reversing the operation just described.

Referring to the constructions illustrated in Figs. 6, 7, 12 and 13 it will be seen that the truck floor is provided with a series of transverse rollers 120 and that a transverse shaft 121 is arranged at the rear end of the truck floor, said transverse shaft 121 having at each end thereof a pulley 122 over which an endless cable 123 passes, suitable tensioning pulleys or idlers 124 being provided for the purpose of tensioning the cable 123 in the manner which is apparent. The said cables 123 pass forwardly and around pulleys 125 and pass transversely of the truck and around pulleys 126, which pulleys 126 are mounted on horizontal longitudinal shafts 127, on which shafts are mounted worm gear wheels 128, which worm gears 128 mesh with a central worm gear 129 mounted on a vertical shaft 130, which vertical shaft 130 has a bevel gear 131 on its lower end which meshes with either one of the pair of slidable bevel gears 132 mounted on the engine shaft 133, said slidable gears 132 being operated by a lever 134 in such manner that either one of said pair of gears 132 can be brought into mesh with the bevel gear 131 in order to rotate the vertical shaft 130 in either direction. At the upper end of the vertical shaft 130 is a worm gear 135 which meshes with worm gear wheels 136 mounted on horizontal longitudinal shafts 137, which shafts carry pulleys 138. Mounted on the shaft 121 at the rear end of the truck and rotatable therewith are two arms 139 having pivoted to the outer ends thereof hooks 140, and connected to the outer ends 141 of said arms 139 is a cable 142 which passes upwardly and forwardly of the truck and over pulleys 143, the cable leading horizontally and forwardly to and over pulleys 144 from whence the cable leads transversely to the pulleys 138 above described.

Figure 6:
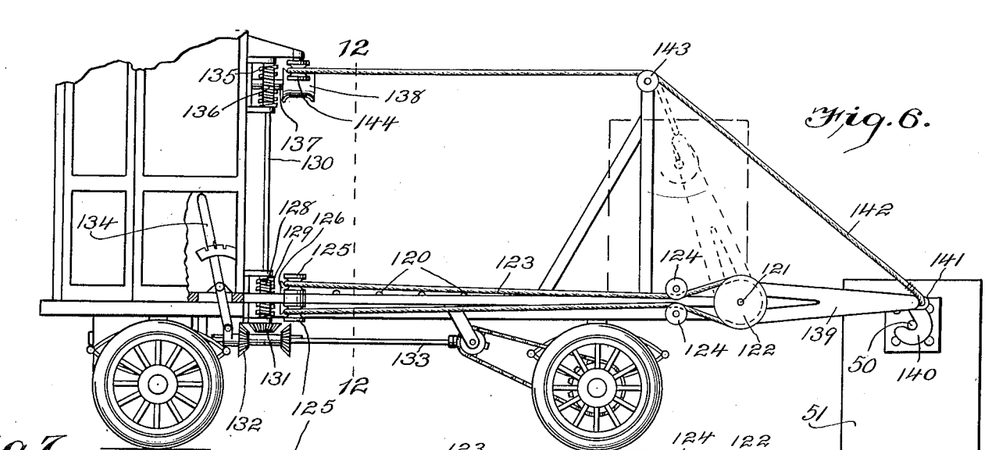
Fig. 6 is a similar view illustrating a modification.
Figure 7:
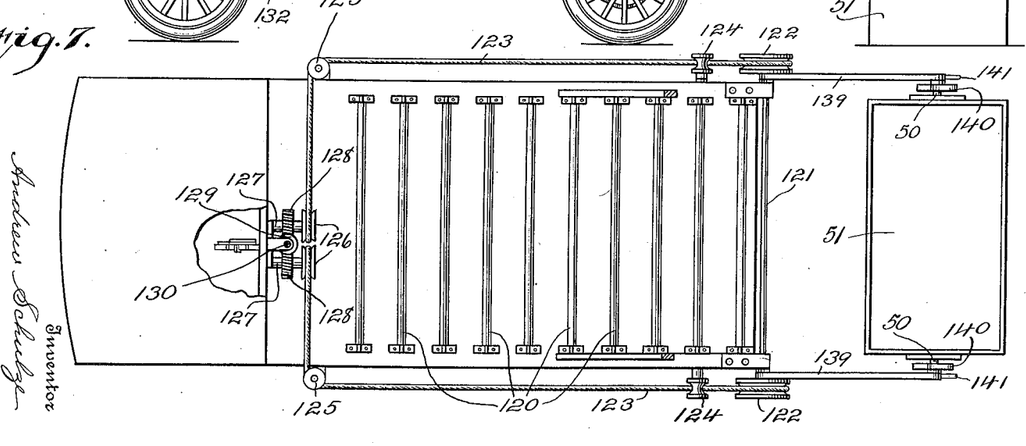
Fig. 7 is a top plan view of the same.

Having thus described the details of the constructions shown in Figs. 6, 7, 12 and 13 its operation is as follows: When it is desired to lower a crate or cage 51 the hooks 140 are connected to the pins 50 as shown in Fig. 6 and the operating lever 134 is moved so as to throw one of the slidable bevel gears 132 into mesh with the bevel gear 131 to rotate the vertical shaft 130 and through the intermediate gearing previously described the endless cables 123 near the floor of the truck are moved in order to rotate the pulleys 122 on the transverse shaft 121 at the rear of the truck, while at the same time the cables 142 at the top of the truck are wound around the drums 138 in order to raise the arms 139 into position shown in dotted lines in Fig. 6, and when the crate or cage 51 is in position shown in dotted lines in Fig. 6 the same can be rolled forwardly of the truck on the rollers 120 and disposed in any convenient position on the floor thereof, the unloading operation being the reverse of that just described.

Figures 4, 5:
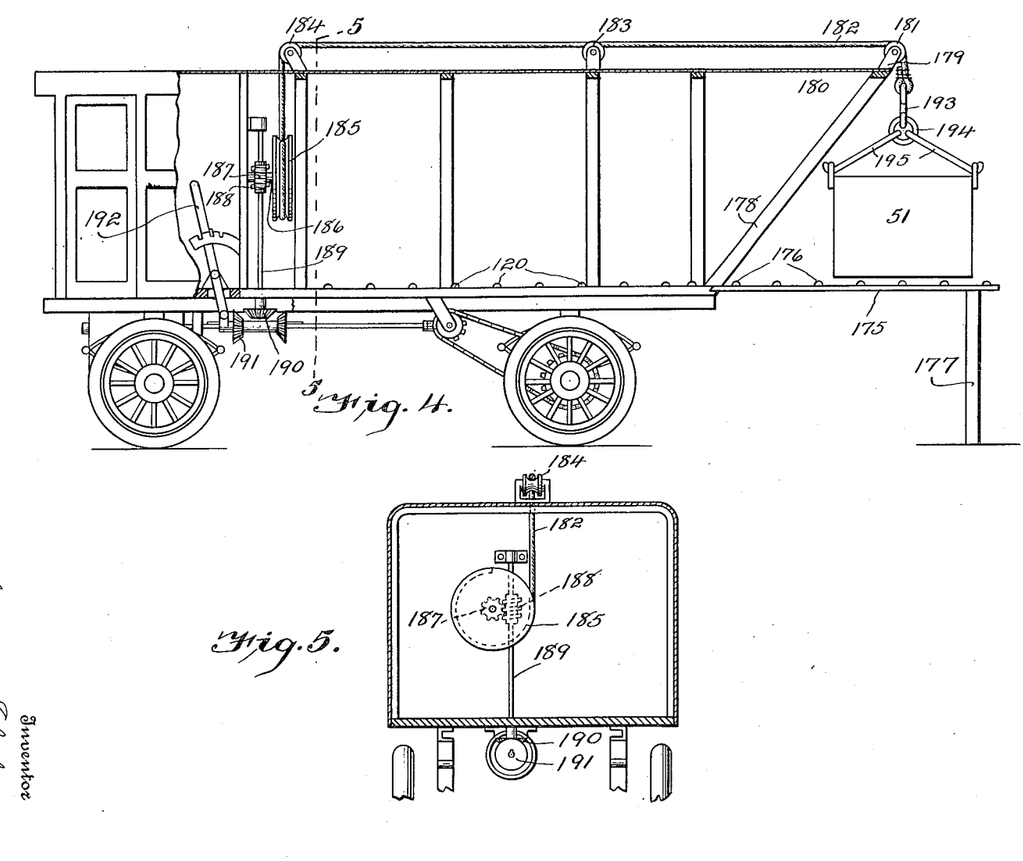
Fig. 4 is a similar view illustrating a further modification.
Fig. 5 is a vertical sectional view through the body of the truck taken on line 5—5 of Fig. 4.

Referring now to the construction illustrated in Figs. 4 and 5 it will be seen that the floor of the truck is provided with a series of transverse rollers 120, and a stage 175 having transverse rollers 176 is provided and supported by braces or legs 177 in such manner as to form a continuance of the floor of the truck as is clearly shown in Fig. 4, the truck being provided at its rear end with an obliquely disposed brace 178, the upper end 179 of which extends beyond the floor proper of the truck, and at the extreme end of the top 180 and central thereof is provided a pulley 181 over which a cable 182 passes, said cable leading forwardly of the truck over pulleys 183 and 184 whence the cable leads vertically and downwardly around a drum 185 mounted on a horizontal longitudinal shaft 186 which meshes with a worm gear 188 mounted on a vertical shaft 189, the lower end of said shaft 189 carrying a bevel gear 190 which meshes with either one of the pair of slidable bevel gears 191 which are moved into and out of mesh with the bevel gear 191 by means of an operating lever 192 in such manner that the vertical shaft 189 can be rotated in either direction. At the rear end of the cable 182 is provided a hook or link 193 connected to a ring 194 which carries two hooks 195 which are designed to engage a crate, cage or the like 51.

Having thus described the details of the construction shown in Figs. 4 and 5 its operation is as follows: Whenever it is desired to lower the truck the operating lever 192 is moved to throw one of the slidable bevel gears 191 into mesh with the bevel gear 190 to rotate the vertical shaft 189 which through the medium of the gearing just described rotates the drum 185 which winds the cable 182 thereon to raise the crate or cage 51 into position shown in Fig. 4. The stage 175 is then placed into position as shown in Fig. 4 and the crate or cage deposited thereon and it is then disconnected from the hooks 195 and can be rolled forwardly of the truck and deposited in any convenient position thereon.

Having thus fully described the several parts of this invention and specifically set forth the modifications illustrated in the several figures it is apparent that certain further changes can be made which would fall within the limit and scope of the appended claims.

What I claim as new and desire to secure by Letters Patent of the United States is:—

1. A loading and unloading device, including motive power means, crane-like elevating lever-members, means for imparting a traveling movement to said lever-members and means for elevating said lever-members, said means for imparting a traveling movement to said lever-members and said means for elevating the same being controlled from said motive power means.

2. A loading and unloading device, including motive power means, crane-like elevating lever-members parallel to each other and equipped with receptacle-attaching means, means for elevating said lever-members and means for imparting a traveling movement to said lever-members, said lever-member elevating means and said means for imparting a traveling movement to said lever-members being controlled from said motive power means.

3. A loading and unloading device, including motive power means, crane-like elevating lever-members, a carrier, said lever-members being fulcrumed to swing upwardly from said carrier, means to effect such upwardly swinging of said lever-members, and means to actuate said carrier, said carrier-actuating means and said lever-member elevating means being controlled from said motive power means.

4. A loading and unloading device, including motive power means, crane-like elevating lever-members, a carrier, a worm-equipped shaft, said carrier being equipped with gearing meshing with the worm of said shaft, said shaft being controlled from said motive-power means, said crane-like elevating lever-members being actuated through the gearing of said carrier.

5. A loading and unloading device, including motive power means, crane-like elevating lever-members, a carrier, an endless belt driven from said motive power means, said carrier being equipped with a toothed wheel, said endless belt engaging said toothed wheel, said crane-like elevating lever-members being controlled through gearing carried by said carrier, and a worm equipped shaft meshing with the carrier-gearing and controlled from said motive power means.

6. A loading and unloading device, including motive-power means, crane-like elevating lever members, a carrier equipped with gearing, a shaft equipped with a worm meshing with the gearing of said carrier, an endless belt engaging a toothed wheel arranged at one end of said carrier, said belt and said crane-like elevating lever-members being controlled through said shaft from said motive power means.

7. A loading and unloading device, including motive-power means, crane-like elevating lever-members, a carrier provided with guide-ways and rollers at its upper and lower corners, an endless belt extending through said guide-ways of said carrier and in contact with said rollers and encompassing a roller at one end of said carrier, a worm-equipped shaft, the worm of said shaft having a sliding connection therewith, said worm and said carrier being intergeared, said worm equipped shaft and said lever-members being controlled from said motive-power means.

8. A loading and unloading device, including motive-power means, crane-like elevating lever-members, a carrier, an endless belt extending through said carrier and engaging a sprocket wheel thereon, a worm equipped shaft, the worm of said shaft having a sliding connection therewith, said worm and said carrier being intergeared, said worm-equipped shaft and said lever-members being controlled from said motive-power means, and lever, shaft and gearing mechanism for effecting such controlling action.

In testimony whereof, I affix my signature, in presence of two witnesses.

ANDREW SCHULZE.

Witnesses:
C. WENDEL SHOEMAKER,
S. W. BOGLEY.